United States Patent [19]

Orndorff

[11] Patent Number: 5,754,933
[45] Date of Patent: May 19, 1998

[54] METHOD FOR PRESERVING RESEARCH RECORDS GENERATED BY COMPUTER

[75] Inventor: Joseph E. Orndorff, Cincinnati, Ohio

[73] Assignee: Invisible Images, Inc., Cincinnati, Ohio

[21] Appl. No.: 684,497

[22] Filed: Jul. 19, 1996

[51] Int. Cl.$^6$ .................................................. G03G 21/00
[52] U.S. Cl. ............................ 399/366; 283/902; 380/51
[58] Field of Search ........................ 399/366; 283/902; 380/51

[56] References Cited

U.S. PATENT DOCUMENTS

| | | | |
|---|---|---|---|
| 4,360,548 | 11/1982 | Skees et al. | 283/902 X |
| 5,149,140 | 9/1992 | Mowry et al. | 283/902 X |
| 5,171,040 | 12/1992 | Orndorff | 283/93 |
| 5,375,886 | 12/1994 | Tsuchiya | 283/902 X |
| 5,618,063 | 4/1997 | Chang et al. | 283/902 X |
| 5,621,503 | 4/1997 | Komaki et al. | 399/366 |
| 5,640,467 | 6/1997 | Yamashita et al. | 399/366 X |

OTHER PUBLICATIONS

Brochure and Instruction Sheet, undated, of Scientific Bindery Productions, 1255 South Wabash Avenue, Chicago, Illinois 60605.

*Primary Examiner*—Fred L. Braun
*Attorney, Agent, or Firm*—Fitch, Even, Tabin & Flannery

[57] ABSTRACT

A system of preserving the integrity of research and comparable data regularly entered into an electronically accessible memory by printing it out periodically upon a form of protected document stock which reveals the fact of copying in every xerographic copy of an original sheet of such stock, and which is accounted for, sheet by sheet, through the use of a unique serial number assigned by the manufacturer of the stock and recorded by him as issued to a given customer/user, and by the use of a record of distribution maintained by the records custodian of a given customer/user to identify specific serially-numbered sheets of such stock as having been issued to a particular person on a particular date, and who collects or receives the printed out stock as a permanent record of the information recorded.

7 Claims, 5 Drawing Sheets

Registry of Patent*Pad*™ Security Paper
for
XYZ Company

This Registry document is permanently secured and maintained in Cincinnati, Ohio by the sole manufacturer of this paper, SCRIP-SAFE® Security Products, Inc. It is available for inspection at the request of the customer. A signed and numbered laser copy, which can be matched to this original document, is sent to the customer.

Product Description:

- Document Order Date: *2/29/96*
- Purchase Order Number: XYZ3145
- Authorized Agent for Customer: J.B.Drew
- Authorized Customer Shipping Address: XYZ Company, *1320 Cullen Drive, Newport, RI 02840*
- Quantity of Forms Ordered: *12,000*
- Security Control Numbering™: Sequential document numbering, beginning with *000001-022996* and ending with *012000-022996* appear on a secured field in red ink in the lower right corner of each sheet of paper.
- Distribution & Utilization Forms Distributed: Sheets numbered *000002/022996 to 000035/022996*
- Document Ink Color: *Black Border, Gray Face*
- Corporate Identification: *"XYZ Company"* appears in white type over the face of the entire document
- Document Size: *8 ½ X 11*
- Security Warning Border: *"Confidential Document Do Not Reproduce Do Not Distribute"* appears in the top and bottom borders.
- Latent Image Message: When photocopied, the hidden words "ILLEGAL COPY" appear over the entire face of each sheet of paper.

Product Description Verified by:

_____ Date: _____

Joseph E. Orndorff, President and CEO, SCRIP-SAFE® Security Products, Inc.
11319 Grooms Road • Cincinnati, OH 45242-1405 ☎ 1-800-736-7319

The SCRIP-SAFE® PatentPad™ Security Paper Registry Form is printed on a secured and sequentially numbered paper.

PatentPad™ Paper
Record of Distribution & Utilization
Issued to: XYZ Company The recipients enumerated below have signed for and received registered PatentPad™ pages:

| Recipient | Numbered Sheets Received | Date Received |
|---|---|---|
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |
| Recipient | Numbered Sheets Received | Date Received |

This Record of Distribution and Utilization is provided by SCRIP-SAFE®, the exclusive manufacturer of the PatentPad™ Security Paper Recording System. It can be verified as authentic by calling 1-800-736-7319.

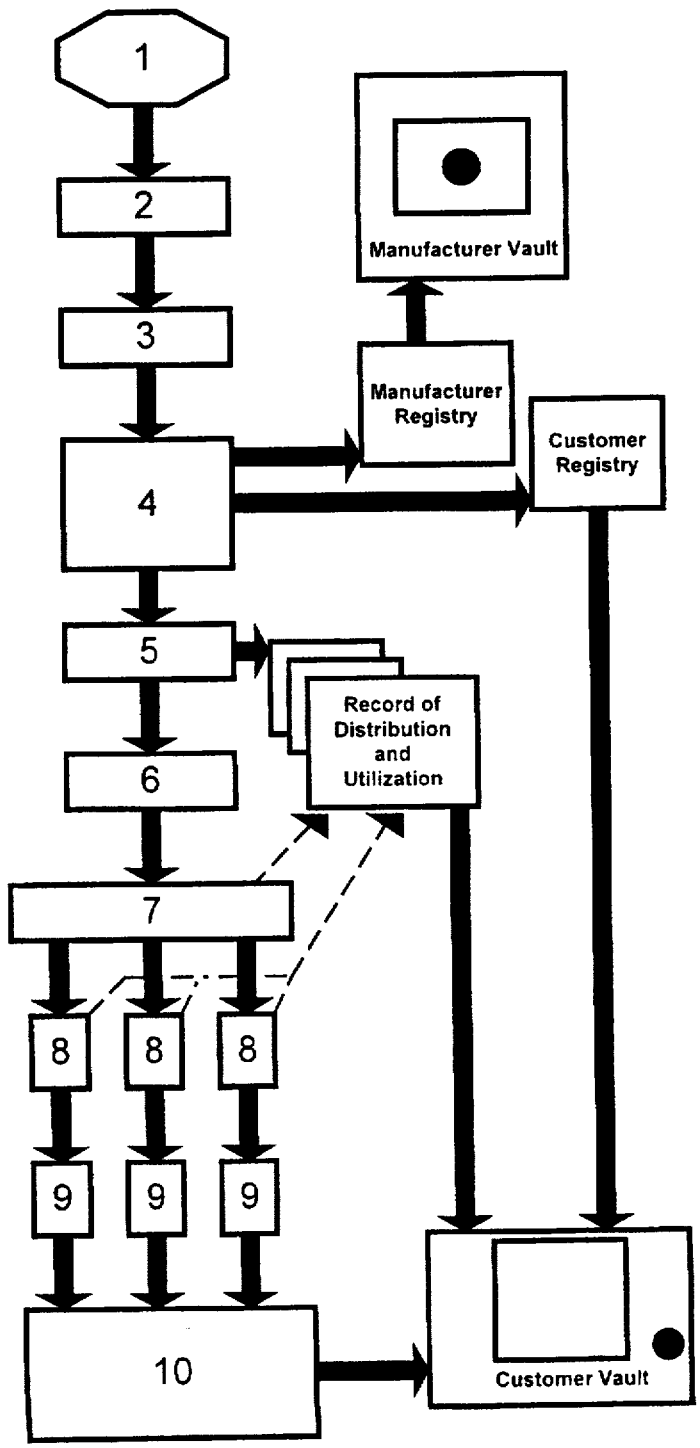

Box 1
Manufacturer and Research
Organization/Customer Select
Unique Serial Number Code Box 2
Latent Image Security Field
Printed on Document Stock Box 3
Unique Numerical Encoding
Printed Onto Each Sheet of
Paper to Constitute a
Secured Document Lot Box 4
Pagination Verified and
Recorded in Duplicate in
"Registry" Form Printed on
Secured Document Stock,
One Copy Retained in Safe-
Keeping by Manufacturer,
One Copy to Customer Box 5
"Record of Distribution &
Utilization" Forms Printed
on Secured Document Stock
and Sent to Customer Box 6
Balance of Secured Document
Lot Shipped to Customer Box 7
Research Supervisor Records
Distributable Sublots of Secured
Document Stock on "Record of
Distribution & Utilization" Form Box 8
Sublots Distributed to Individual
Researchers, who Receipt for
Sublot on "Record of Distribution &
Utilization" Form Box 9
Researcher Prints and Signs Daily
Output on Registered Secured
Sheets, has Them Witnessed and
Returns Them to Research
Supervisor Box 10
Research Supervisor Reviews and
Files the Returned Printouts, as
Verifiable Record of Work in
Progress, in Serial Number Order to
Facilitate Later Access

Fig. 6

METHOD FOR PRESERVING RESEARCH RECORDS GENERATED BY COMPUTER

This invention resides in a system for preserving the integrity of data regularly entered in an electronically accessible memory by printing it upon a protected form of document stock used in the system for the permanent retention of information.

BACKGROUND OF THE INVENTION

While the importance of record keeping to organized research in technical and scientific fields, and otherwise, is almost universally recognized, the permanent recording of observations, conclusions, and even data, in retrievable permanent form, is frequently regarded by the researcher as an intrusion upon the progress of a project, and at best a barely tolerable if necessary evil.

The extent to which researcher reluctance and procrastination affects the regularity upon which the credibility of research records depends is a continuing concern of research managers, whose ability to instill a sense of self-discipline in the research staff in keeping regular research records is sometimes limited.

The present invention eases the burdens of researcher and manager alike by providing a means of reducing research data and observation to permanent record form without the tedium of maintaining the traditional, bound, laboratory notebook.

SUMMARY OF THE INVENTION

Recognizing that every research station, if not every researcher, is provided in this age with a personal computer with which data and observations are entered into an electronically accessible memory, the system of the invention contemplates the printing out of such data, observations, and related information, on a regular basis, preferably daily, onto a special form of protected and accountable document stock, and its storage in that form as a contemporaneous record of the research.

The document stock employed is a preprinted and registered paper substrate having on at least one side a field of printed halftone dots, of frequency and size respectively above and below the dot resolution capability of xerographic copiers, which spell out a legend indicative of copying upon xerographic copies of such stock. Each sheet of such stock is likewise overprinted with a number code that uniquely identifies each sheet to establish the date of its origination for a particular user and to facilitate the tracking of the issuance thereof by, and its return to, the record depository of the research organization using the system.

The manufacturer maintains a registry which describes and identifies the stock by purchaser, format, date and customer purchase order, and coded serial numbers of the stock purchased with each order, and is itself printed upon a numbered sheet of the protected document stock. The purchaser in turn receives a copy of the same registry also printed upon a numbered protected sheet, and maintains on another sheet or sheets of the protected document stock a written record of issuance of the coded stock to individual researchers. That record is then used to police the recording and the return to file of research data generated by the individual researcher, who prints out selectively, on a daily basis preferably, the information and data he wishes to preserve, without having to hand write, or paste clippings, into a bound notebook.

DESCRIPTION OF THE DRAWINGS

FIG. 4 is a register of the creation for a particular customer of a coded series of protected document stock illustrated in FIG. 1;

FIG. 5 is a copy of the record of distribution and utilization maintained by the purchaser to record the issuance of particular serially-numbered record sheets to an individual researcher; and FIG. 6 is a labeled flow diagram which illustrates the data-securing system of the invention in graphic form.

DESCRIPTION OF PREFERRED EMBODIMENT

Figure 1:
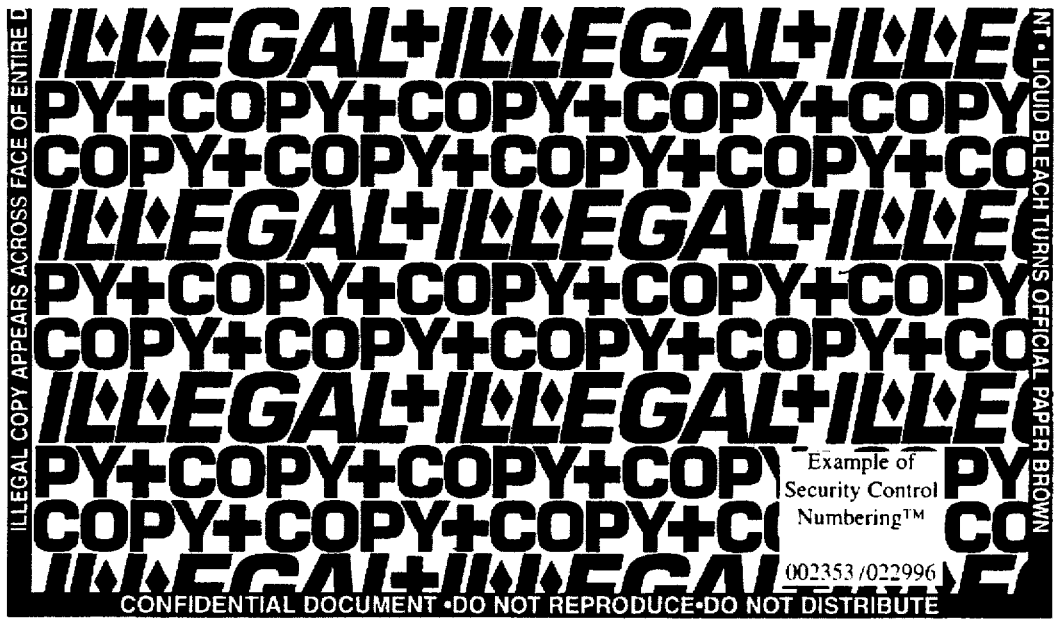
FIG. 1 is a fragmentary reduction of what normally would be a xerographic copy of an 8½"×11" number-coded protected record sheet in accordance with the invention.

FIG. 1 is a fragment of a sheet of the coded protected stock used in the system of the invention. It is reduced from actual size approximately 65% but illustrates the protective legend which appears from the protective halftone field in which the document is printed when the original is copied xerographically. The halftone field uses two screen sizes, namely, 65 and 130 lines per inch respectively, the former being readily resolvable by xerographic copiers at all settings and the latter being beyond the resolving power of most copiers at most settings, absent magnification. Thus, the copier prints the 65 line material but suppresses its finer surroundings to expose the legend of copying shown by FIG. 1.

Figure 2:
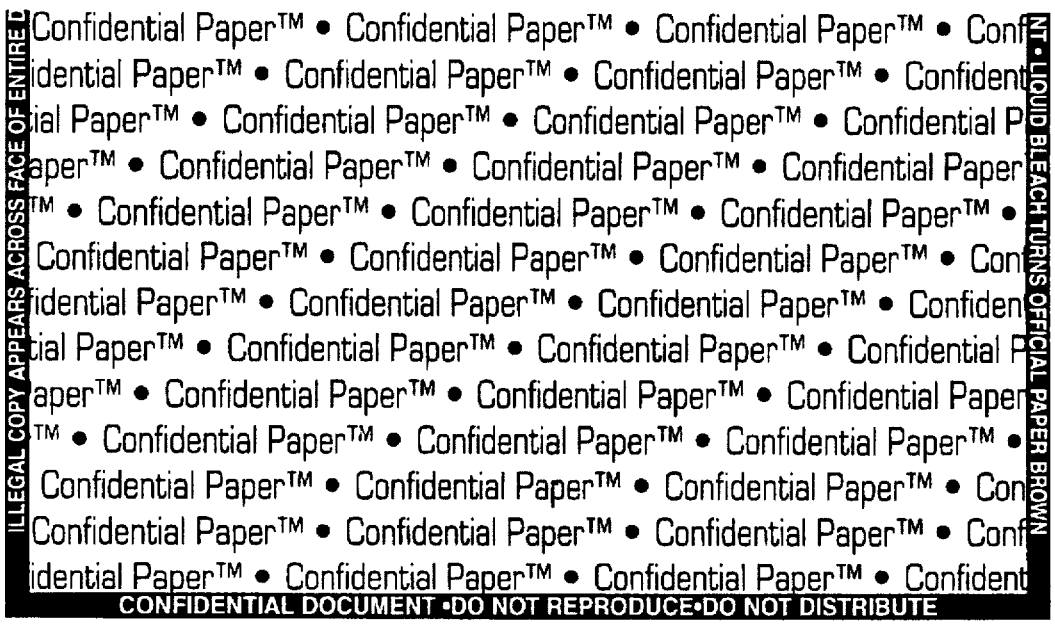
FIG. 2 is a comparably reduced copy of a mask used in preparing the photolithographic plate, to produce a "reverse" image of its content on the record sheet.

As it is not practicable to illustrate the protected sheet of the invention in actual size precisely as it appears in actuality, owing to the fact that reproduction of the original, as such, by photo xerography without exposing the copy-defeating indicia, as in FIG. 1, is not possible, FIG. 2 has been supplied to illustrate one form of mask which can be used over the two-screen halftone field to apply a trademark in the step-and-repeat reverse image discernable only with difficulty in FIG. 1. The trademark is shown for illustrative purposes in FIG. 2 against a uniform halftone field of a single screen size. In the actual document, it appears as white against the two-screen halftone field of black, i.e., gray, or colored ink, which to the naked eye appears uniform due to the visual balance attained by the technique of my U.S. Pat. No. 5,171,040, FIG. 3 of which has been excerpted as FIG. 3 hereof. That technique relies upon the relative area coverage of the two halftone screens in an allover pattern of characters which constitute the invalidating terminology, and the relative tone densities in which the 65 line and 130 line halftone portions are printed for concealment of the invalidating terminology without the aid of added camouflage. Other latent-image copy-revealing techniques for invalidating copies may be used, as long as they provide for the telltale revelation of copying in xerographic copies of the protected stock.

Figure 3:
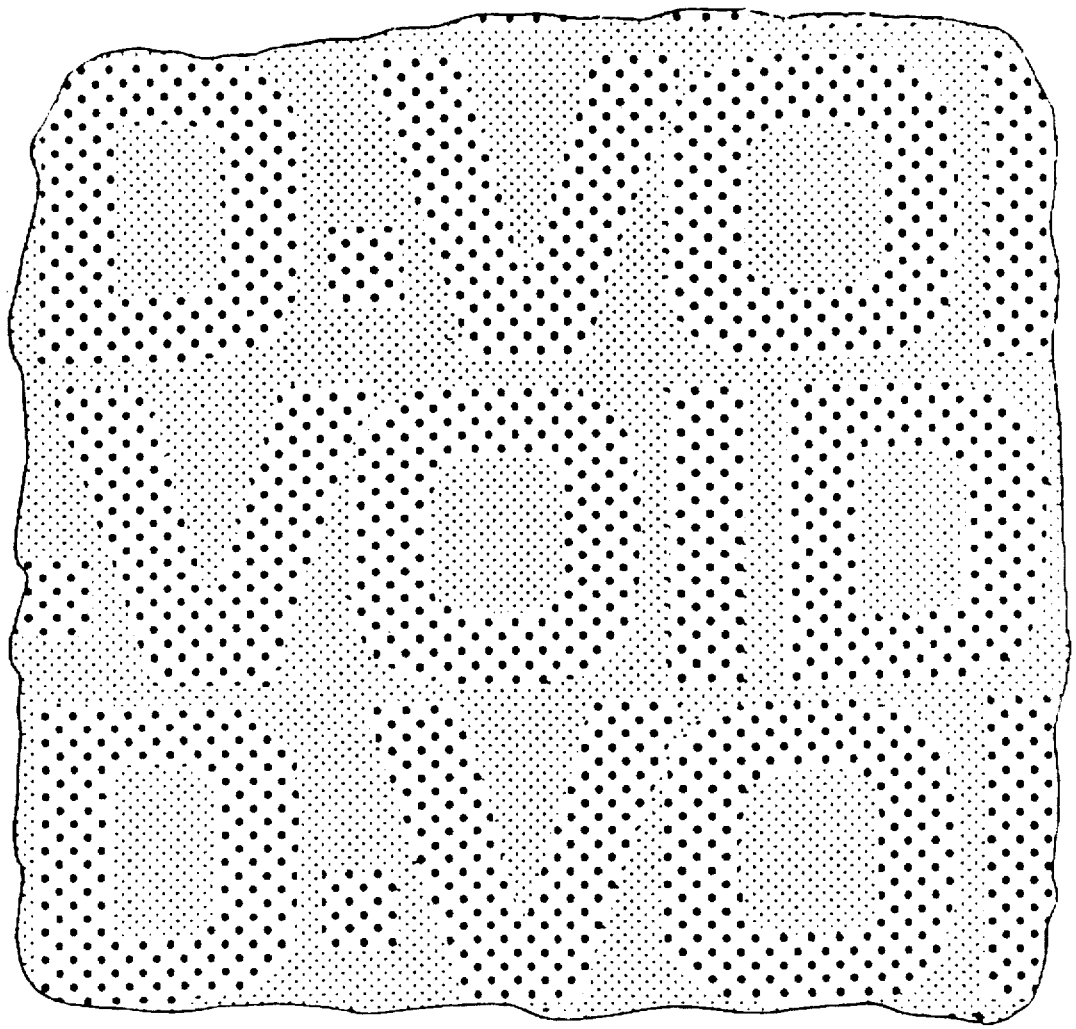
FIG. 3 is a drawing excerpted from my U.S. Pat. No. 5,171,040 to illustrate the principle of the inclusion of indicia of xerographic copying in the original, using my preferred mode of concealment thereof from the naked eye in the original.

In FIG. 1, the telltale legend of copying, printed in 65 line screen upon the original, is "Illegal Copy". It could also be the word "VOID", as shown in FIG. 3 and in my prior patent, or indeed any word warning that the copy is precisely that, and not an original. This is an important aspect of the system, namely that a copy always be detectable as such, and that no duplicate original is possible, every single sheet of the protected document stock being uniquely serially numbered and accounted for by that number. As further precaution against masquerading pseudo originals, the stock is treated so as to be verifiably bona fide, viz., to turn brown when contacted by a liquid bleaching agent.

Uniqueness is achieved by each of a number of features of the protected stock in addition to the uniqueness attributable to the patented status of the particular method used for concealment of the latent copy-revealing warning. In particular, as shown by FIG. 1, each sheet of protected stock, as an example, bears an overprinted coded serial number, of which the first six digits are the serial number of the individual sheet within the document stock lot identified by the last six digits, which are, preferably, the month, day, and year of the customer/user's purchase order. Thus the code number illustrated in the lower right-hand corner of FIG. 1, namely "002353/022996", identifies the two thousand three hundred fifty-third sheet of the document stock lot ordered by XYZ Company on Feb. 29, 1996.

While the date of purchase order to the vendor of the protected document stock is inherently unique to a given customer/user, other unique designators can be used. For example, the customer/user's purchase order number itself would normally be unique and could be used if not unmanageable in size. Indeed, any alpha-numeric, bar code, or other graphic designation the purchaser might wish to assign uniquely to that particular purchase transaction could be used, such as "XYZ001" to indicate the first protected document lot ordered by XYZ Company. The date of purchase order on the vendor, however, is inherently unique, readily understood both by vendor and customer/user, each of whom has a role in the system of the invention to assure the security of the data to be recorded as well as the utility of those records, when needed, in the proof of the facts and events they will be used to record.

Most users of the system, it is believed, will also wish to have the illustrated document stock carry a visible mark of origination, which may be a company name or logo, which can appear on a margin or border framing the halftone field of the sheet, or may appear in or on the central area of the sheet as a light-colored, preferably transparent, overprint, or as a "reverse" image by masking during the preparation of the printing plate to withhold ink selectively in the printing of the halftone protective field.

The method of the invention contemplates the maintenance of two registers. The first, called a "Registry" and shown in FIG. 4, is used to record the purchase order and order date of each lot of protected document stock by a particular purchaser, together with the first and final serial number of each document of the lot. For example, in FIG. 4, the Registry shows that the purchaser XYZ Company, by its Purchase Order XYZ3145 of Feb. 29, 1996, ordered 12,000 pieces of protected document stock numbered serially from 000001/022996 to 012000/022996.

The second register, shown in FIG. 5 and called "Record of Distribution & Utilization", is maintained by the research record custodian of XYZ Company to record the issuance of protected documents to a particular researcher on a given date, and provides a current record from which to police delinquent attention to research data entry.

Both the "Registry" (FIG. 4) and the "Record of Distribution & Utilization" (FIG. 5) are, as earlier noted, printed upon sheets of the serially-numbered protected stock, the "Registry" (FIG. 4) carrying serial number "000001/022996" and the "Record (etc.)" (FIG. 5) carrying serial number "000002/022996". The protecting halftone fields have been omitted from FIGS. 4 and 5 to avoid confusing the overprinted material thereon with the overall protective legend "Illegal Copy" which would otherwise appear in photographic copies of the patent drawings and/or xerographic copies thereof.

The system as a whole relieves the researcher of the tedious chore of transferring data and conclusions from his computer memory by handwriting them into the serially numbered pages of a bound laboratory notebook, and of cutting and pasting tables of recorded data or sketches into the pages of a bound book. It has the further capacity therefore, particularly if used on a daily basis, as contemplated, of increasing the volume of retained information by eliminating the natural tendency to edit down by abbreviation of the written message as well as of the technical terms employed.

Upon return of the completed document or documents to the research record custodian, signed by the researcher, dated, and witnessed, they are filed serially in the custodian's repository, having been pre-indexed by researcher, issue date, and serial number when issued. Subject matter indexes, if any are prepared for later accessing the stored data, can refer to the researcher and the research period, from which the second register, i.e., the "Record of Distribution & Utilization", FIG. 5, identifying the given researcher, provides the document serial numbers as retrieval locators.

The foregoing procedures are summarized graphically in the flow diagram of FIG. 6, in which the steps of the method for preserving the integrity of research data are delineated in their most complete form, beginning in Box 1 with the selection by the manufacturer and the customer/research organization of the particular form of unique serial number code to be used. At the same time, the customer would decide upon the preferred copy-revealing latent-image terminology and particular form and method of incorporating the customer's company name or other identification in the secured stock, and the size of the lot of secured documents required.

The manufacturer proceeds to print the latent-image security field on one side of the selected document stock (Box 2), which will typically be 8½"×11" in size, for convenient use in laser printers and for storage.

The printing of the latent-image halftone field is followed by the printing upon each sheet of the document lot its own unique serial number (Box 3). While Boxes 2 and 3 can be combined in a single operation, the desirability of closely monitoring the quality of the printing of the latent-image halftone field makes it advisable to first accumulate the necessary number of latent-image sheets of first quality before overprinting the unique serial numbers thereon.

When both printing operations have been performed to produce the required lot of protected stock, the Registry is printed in duplicate upon two sheets thereof, verified by the manufacturer (Box 4). One copy is retained in safekeeping by the manufacturer and the duplicate sent for safekeeping by the customer.

In similar fashion, multiple copies of the "Record of Distribution & Utilization" form are printed on the protected stock (Box 5) and sent to the customer, either separately or with shipment of the remaining blank, serially-numbered sheets of the document stock lot (Box 6).

With the document stock lot in the customer's hands, the supervisor of research causes it to be broken into distributable sublots for distribution to individual researchers, and records upon the "Record of Distribution & Utilization" the spread of the serial numbers of each sublot of secured document stock (Box 7).

The recorded sublots are then distributed to the individual researchers (Boxes 8) who sign off on the "Record of Distribution & Utilization" to acknowledge receipt of their respective numbered sublots. The entries of the supervisor and the individual researchers upon the "Record of Distribution & Utilization" are indicated by the broken lines running from Boxes 7 and 8 to the representation of the "Record of Distribution & Utilization" forms in FIG. 6, it being understood that those forms are stored in safekeeping, as indicated.

With the blank document sublots distributed, the individual researchers print their research data and observations previously entered in their respective station computer-accessible memories, preferably on a daily basis, upon the protected document stock, using the sheets in serial number order (Boxes 9) and sign, date, and return the laser printed sheets to the research supervisor after they have been signed and dated by a knowledgeable witness.

The supervisor reviews the document printouts, witnesses them, and files them in serial number order in safekeeping (Box 10), making whatever note of that fact deemed suitable upon the "Record of Distribution & Utilization" from which each sublot of protected document stock was issued.

Any subject matter retrieval index that may be desired by the research organization can be prepared on the basis of the information in the "Record of Distribution & Utilization", adding appropriate notation of subject matter to the name, date of issuance, and document serial numbers of the sheets turned in. Such index is preferably entered in memory at a supervisory computer programmed to be scannable by researcher, date, and subject matter, or any combination thereof, in order to identify stored secured documents by the serial numbers according to which they had been filed.

The system of the invention is not intended to supplant ongoing electronic memory or to interfere with the flexible utility of data storage in a form electronically accessible over extended periods. Its purpose is rather to create, on a periodic basis, preferably daily, a hard copy record that can be relied upon in future to establish indisputably the existence of documented data on a given date.

The credibility of such original records as evidence of the existence of the recorded data on a given date would seem unassailable, assuming minimal verification of the record keeping procedure by the records custodian, irrespective of whether acceptance of the data as recorded fact might require the further testimony of the researcher and/or the person witnessing the record.

The features of the invention believed to be new and patentable are set forth in the following claims.

What is claimed is:

1. A method of preserving the integrity of research data regularly recorded by a researcher into an electronically accessible memory, which comprises the steps of:

preparing a lot of secured printed document stock comprising successive sheets which are preprinted with successive serial numbers and a number series code;

recording said lot of serially numbered sheets in a register which describes the individual sheets, identifies the party on whose behalf they were prepared, and the date of that party's order therefor;

issuing a quantity of said numbered sheets to an individual researcher for recording his research data and observations;

maintaining a record of the issuance of such sheets by researcher, serial numbers, and date of issuance;

causing said researcher to print out periodically from said electronically accessible memory onto consecutively numbered sheets of said secured stock his accumulated data and observations and to sign and date the same and to have the same witnessed; and collecting and preserving said signed and witnessed sheets in a repository maintained separately from said researcher;

wherein the secured character of said document stock is established by providing thereon a printed field of halftone dots of size respectively above and below the copying threshold of xerographic copying wherein the small dots fail to appear in xerographic copies and reveal a latent legend indicating that the copy is counterfeit, the absence of said legend in a xerographic copy indicating that a purported original is not bona fide.

2. The method of claim 1 wherein the printing out of said data and observations, and the collecting of the sheets bearing the same, is effected daily.

3. The method of claim 1 wherein the bona fides of said secured document stock is verifiable by visible reaction to a commonly available chemical substance in reactable form.

4. The method of claim 3 wherein said stock is impregnated with a substance which turns brown upon contact with liquid bleach.

5. The method of claim 1 wherein said steps of preparing and recording are performed by a party other than the party for whom said sheets were prepared, and who maintains permanent custody of said register.

6. The method of claim 5 wherein said register itself is made upon said serially numbered stock.

7. The method of claim 5 or 6 wherein a duplicate original of said register is furnished by said other party to the party on whose behalf said lot of secured document stock was prepared, and maintained by the latter in said repository.

* * * * *